O. A. HEPPES.
WATERPROOF COVERING AND PROCESS OF MAKING SAME.
APPLICATION FILED APR. 19, 1919.

1,376,092.  Patented Apr. 26, 1921.

Witness,
ᴅ. Mann

Inventor,
Otto A. Heppes
By Frank L. Belknap
Atty.

UNITED STATES PATENT OFFICE.

OTTO A. HEPPES, OF CHICAGO, ILLINOIS.

WATERPROOF COVERING AND PROCESS OF MAKING SAME.

1,376,092.　　　　　Specification of Letters Patent.　　Patented Apr. 26, 1921.

Application filed April 19, 1919. Serial No. 291,302.

*To all whom it may concern:*

Be it known that I, OTTO A. HEPPES, a citizen of the United States, residing in the city of Chicago, county of Cook, and State of Illinois, have invented certain new and useful Improvements in Waterproof Coverings and Processes of Making Same, of which the following is a specification.

This invention relates to improvements in waterproof covering and process of making same and refers more particularly to a prepared roofing having a design of predetermined configuration upon the upper surface thereof.

Among the salient objects of the invention are to provide a waterproofing element such as prepared roofing having over its entire exposed upper surface a granular facing but said granular facing being so applied to form designs or patterns thereon; to provide a product of the character above referred to in which a granular facing of one color is first applied over the entire upper surface of the roofing or waterproofing and then a granular facing of a different color applied to predetermined areas or outlines of said first facing so as to form designs or patterns thereon; to provide a product in which both of said facings are so applied to the adhesive coating as to prevent exposing the latter or forcing it up through the granular facings; to provide a novel process of forming said roofing and in general to provide improvements in waterproofing of the character referred to.

Figure 1:
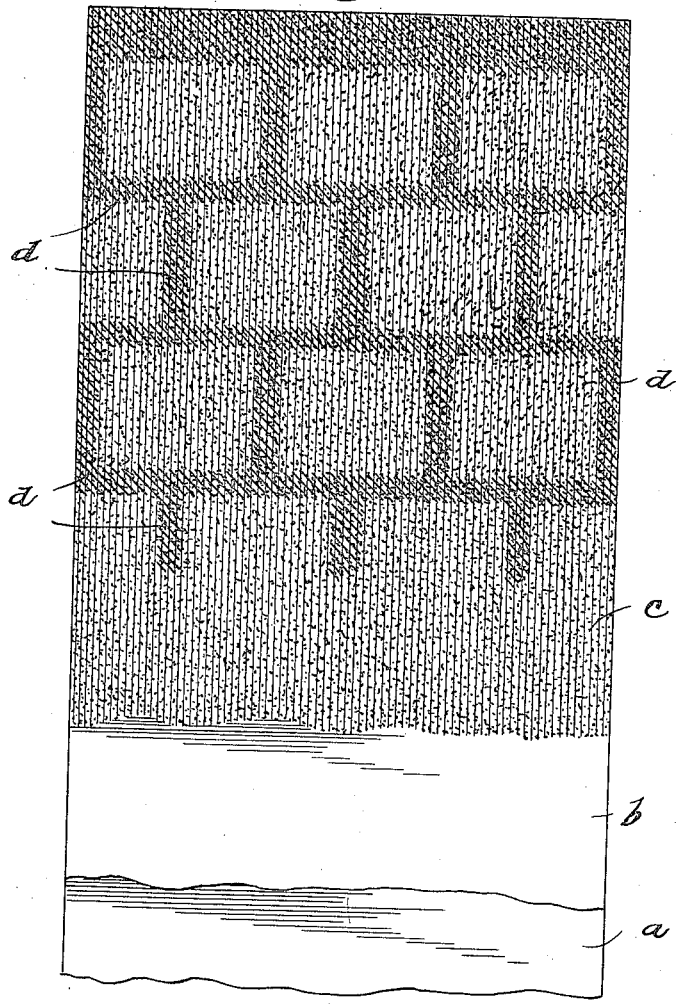
Figure 1 is a plan view of a roofing length made in accordance with my invention with parts broken away.
Figure 2:
Fig. 2 is a sectional view of the same.

Describing now the manner of producing my product I take a backing sheet $a$ which may consist of saturated felt and to the upper surface of which is applied an adhesive coating $b$ of asphalt or other bitumen. Over the surface of this adhesive coating I apply a granular facing $c$ of for example crushed red gravel or red stone. While the roofing sheet is still hot by means of a suitable roller having pattern recesses therein, I apply a granular outline of different color than the first as for example crushed green gravel or green stone designated $d$. This pattern $d$ is applied in any desired configuration by means of suitable elevations and recesses in the roller and then is forced down into the interstices between the particles composing the first facing so that the pattern $d$ intimately adheres to and is partially embedded in the adhesive bituminous coating beneath. It is to be clearly understood, however, that I do not force the second granular facing down into the adhesive coating so as to expose the latter but on the contrary the second granular facing is so applied as to expressly avoid this. In other words, the entire or substantially the entire exposed surface of the roofing whether where only the red facing is applied or where the green facing is applied with the red is entirely a granular facing and the black bitumen beneath is effectively concealed from view. Inasmuch as the pattern of green is applied while the roofing is still hot and immediately after the red facing is applied, no difficulty will be experienced in forcing the second or green facing into the adhesive coating and in such a way that it is permanently held thereby. The pattern or design formed by forcing the green facing into the red in the manner described will give a sharp outline of a distinct and different color than that part of the facing to which only the red granular material is applied. It is to be understood of course that I have reference to red and green granular materials only by way of illustration and that I can use granular materials of any desired colors as long as the second granular material is of a different color than the first. The practice may be carried out as a continuous one and the second facing may be so applied that the outlines formed thereby will be substantially flush or nearly flush with the main surface of the roofing. It may be desirable to depress the outline in some cases but care should be taken to avoid depressing the coating or any substantial part thereof.

I claim as my invention:

1. A waterproofing element consisting of a saturated backing sheet having an adhesive coating, a granular facing of a predetermined color applied over the entire area of said adhesive coating so as to effectively cover the same and be partially embedded therein and a second granular facing of a different color than the first applied to predetermined areas of said facing and partially embedded in the coating, said second facing contacting with and filling the interstices between first granular facing.

2. A process of making prepared waterproofing elements consisting in applying adhesive coating to a backing length, entirely covering said adhesive coating with a granular facing of predetermined color, partially embedded in said coating and then applying a granular facing of a different color than the first to predetermined areas of the sheet and partially embedding said second granular facing in said coating without, however, exposing the latter.

3. A waterproofing element consisting of a saturated backing sheet having an adhesive coating, a granular facing such as crushed gravel or slate of a predetermined color applied over the entire area of said adhesive coating so as to effectively cover the same and be partially embedded therein and a second granular facing of the same general character but of a different color than the first applied to predetermined areas of said facing and partially embedded in the coating.

OTTO A. HEPPES.